(12) United States Patent
Tissot

(10) Patent No.: US 9,891,364 B2
(45) Date of Patent: *Feb. 13, 2018

(54) WAVEGUIDE APPARATUS FOR ILLUMINATION SYSTEMS

(71) Applicant: L.E.S.S. Ltd, Ecublens (CH)

(72) Inventor: Yann Tissot, Lausanne (CH)

(73) Assignee: L.E.S.S. LTD, Renens (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/381,664

(22) Filed: Dec. 16, 2016

(65) Prior Publication Data
US 2017/0160454 A1 Jun. 8, 2017

Related U.S. Application Data

(63) Continuation of application No. 14/113,905, filed as application No. PCT/IB2012/000617 on Mar. 28, 2012, now Pat. No. 9,541,694.

(60) Provisional application No. 61/480,216, filed on Apr. 28, 2011.

(51) Int. Cl.
*F21V 8/00* (2006.01)

(52) U.S. Cl.
CPC ........... *G02B 6/001* (2013.01); *G02B 6/0003* (2013.01); *G02B 6/0026* (2013.01); *G02B 6/0028* (2013.01); *G02B 6/0031* (2013.01)

(58) Field of Classification Search
CPC .... G02B 6/001; G02B 6/0003; G02B 6/0028; G02B 6/0026; G02B 6/0031
See application file for complete search history.

(56) References Cited

U.S. PATENT DOCUMENTS

| 4,138,194 A | 2/1979 | Beasley et al. |
| 5,222,794 A | 6/1993 | Windross |
| 5,579,429 A | 11/1996 | Naum |
| 5,633,748 A | 5/1997 | Perez et al. |
| 5,845,038 A | 12/1998 | Lundin et al. |

(Continued)

FOREIGN PATENT DOCUMENTS

| CN | 1981220 | 6/2007 |
| CN | 101839407 | 9/2010 |

(Continued)

OTHER PUBLICATIONS

PCT International Search Report and Written Opinion (dated Jul. 2, 2012), International Application No. PCT/B2012/000617—International Filing Date Mar. 28, 2012, 13 pages.

(Continued)

*Primary Examiner* — Thomas M Sember
(74) *Attorney, Agent, or Firm* — Blakely Sokoloff Taylor & Zafman LLP

(57) ABSTRACT

A waveguide such as optical fiber is to receive a primary light in a longitudinal (propagation) direction. The fiber has formed therein scattering structures that re-direct the propagating primary light out of the waveguide, for instance in a transverse direction. A photo-luminescent layer absorbs the re-directed primary light to thereby emit secondary wavelength converted light having a different wavelength than and broader bandwidth than the primary light, resulting in white illumination light, being the secondary light combined with any unabsorbed primary light. Other embodiments are also described and claimed.

29 Claims, 10 Drawing Sheets

(56) References Cited

U.S. PATENT DOCUMENTS

| | | |
|---|---|---|
| 5,905,837 A | 5/1999 | Wang et al. |
| 5,982,962 A | 11/1999 | Koops et al. |
| 6,104,371 A | 8/2000 | Wang et al. |
| 6,347,172 B1 | 2/2002 | Keller et al. |
| 6,398,778 B1 | 6/2002 | Gu et al. |
| 6,519,401 B1 | 2/2003 | Imamura et al. |
| 6,546,174 B2 | 4/2003 | Clarkin |
| 6,614,172 B2 | 9/2003 | Chiu et al. |
| 6,636,686 B1 | 10/2003 | Belfer |
| 6,655,825 B2 | 12/2003 | Muthu et al. |
| 6,714,185 B2 | 3/2004 | Kim et al. |
| 6,714,711 B1 | 3/2004 | Lieberman et al. |
| 6,896,398 B2 | 5/2005 | Chambers et al. |
| 7,024,076 B2 | 4/2006 | Ohta et al. |
| 7,437,035 B2 | 10/2008 | Carver et al. |
| 7,505,655 B2 | 3/2009 | Yamazaki et al. |
| 7,512,300 B2 | 3/2009 | Robertson et al. |
| 7,780,326 B2 | 8/2010 | Ito |
| 7,826,698 B1 | 11/2010 | Meir et al. |
| 7,868,341 B2 | 1/2011 | Diana et al. |
| 8,897,612 B2 | 11/2014 | Logunov |
| 2002/0018629 A1 | 2/2002 | Lieberman et al. |
| 2005/0012076 A1 | 1/2005 | Morioka |
| 2006/0001037 A1 | 1/2006 | Schardt et al. |
| 2007/0053634 A1 | 3/2007 | Carver et al. |
| 2007/0263405 A1 | 11/2007 | Ng et al. |
| 2008/0017872 A1 | 1/2008 | Kim, II |
| 2008/0069497 A1 | 3/2008 | Tissot et al. |
| 2008/0069560 A1 | 3/2008 | Tissot et al. |
| 2009/0027914 A1 | 1/2009 | Wu |
| 2009/0207867 A1 | 8/2009 | Shapira et al. |
| 2009/0257242 A1 | 10/2009 | Wendman |
| 2010/0165599 A1 | 7/2010 | Allen |
| 2010/0238374 A1 | 9/2010 | Ohse |
| 2010/0271842 A1 | 10/2010 | Cheang et al. |
| 2010/0283376 A1 | 11/2010 | Kanade et al. |
| 2011/0204405 A1 | 8/2011 | Tsutsumi et al. |
| 2012/0106127 A1 | 5/2012 | Hattori et al. |
| 2012/0275745 A1 | 11/2012 | Logunov |
| 2013/0272014 A1 | 10/2013 | Logunov et al. |
| 2014/0098011 A1 | 4/2014 | Gollier |
| 2014/0140090 A1 | 5/2014 | Logunov et al. |

FOREIGN PATENT DOCUMENTS

| | | |
|---|---|---|
| EP | 1376003 | 1/2004 |
| EP | 2302427 | 3/2011 |
| JP | H08320417 | 12/1996 |
| JP | 2000039517 | 2/2000 |
| JP | 2000147263 | 5/2000 |
| JP | 2002367404 | 12/2002 |
| JP | 2004287067 | 10/2004 |
| JP | 2007227573 | 9/2007 |
| JP | 2008505440 | 2/2008 |
| WO | WO-9922174 | 5/1999 |
| WO | WO-2006007097 | 1/2006 |
| WO | WO-2009004597 | 1/2009 |
| WO | WO-2009040725 | 4/2009 |
| WO | WO-2010044239 | 4/2010 |
| WO | WO-2011063214 | 5/2011 |
| WO | WO-2012146960 | 11/2012 |
| WO | WO-2013052413 | 4/2013 |
| WO | WO-2013066668 | 5/2013 |
| WO | WO-2015031551 | 3/2015 |
| WO | WO-2015056220 | 4/2015 |

OTHER PUBLICATIONS

PCT International Preliminary Report on Patentability (dated Nov. 7, 2013), International Application No. PCT/B2012/000617—International Filing Date Mar. 28, 2012, 8 pages.

PCT International Search Report and Written Opinion (dated Jan. 9, 2015), International Application No. PCT/IB2014/065386, International Filing Date Oct. 17, 2014, 10 pages.

China Office Action (dated Nov. 3, 2015), Chinese Patent Application No. 201280032264.4, 26.

Japanese Office Action (dated Feb. 16, 2016), Japanese Application No. 2014-506942, 8 pages.

PCT International Written Opinion of ISA (dated Apr. 19, 2016), International Application No. PCT/IB2014/065386, International Filing Date Oct. 17, 2014, 6 pages.

Non-Final Office Action (dated May 6, 2016), U.S. Appl. No. 14/113,905, filed Dec. 3, 2013, First Named Inventor: Yann Tissot, 7 pages.

Translation of Japanese Office Action, dated Nov. 1, 2016, Japanese Application No. 2014-506942.

Carver, G. E., et al., "A Fiber Grating Based Distributed Light Source", *Photonic Sensing Technologies*, Proc. of SPIE, vol. 637, 63710H-A1, (2006), 7 pages.

Spigulis, Janis, "Side-Emitting Fibers Brighten Our World in New Ways", *OPN Oct. 2005*, Internet Document at: www.osa-opn.org, 6 pages.

European Examination Report, dated Mar. 21, 2017, European Application No. 12720570.6.

European Examination Report, dated Sep. 22, 2017, European Application No. 12720570.6.

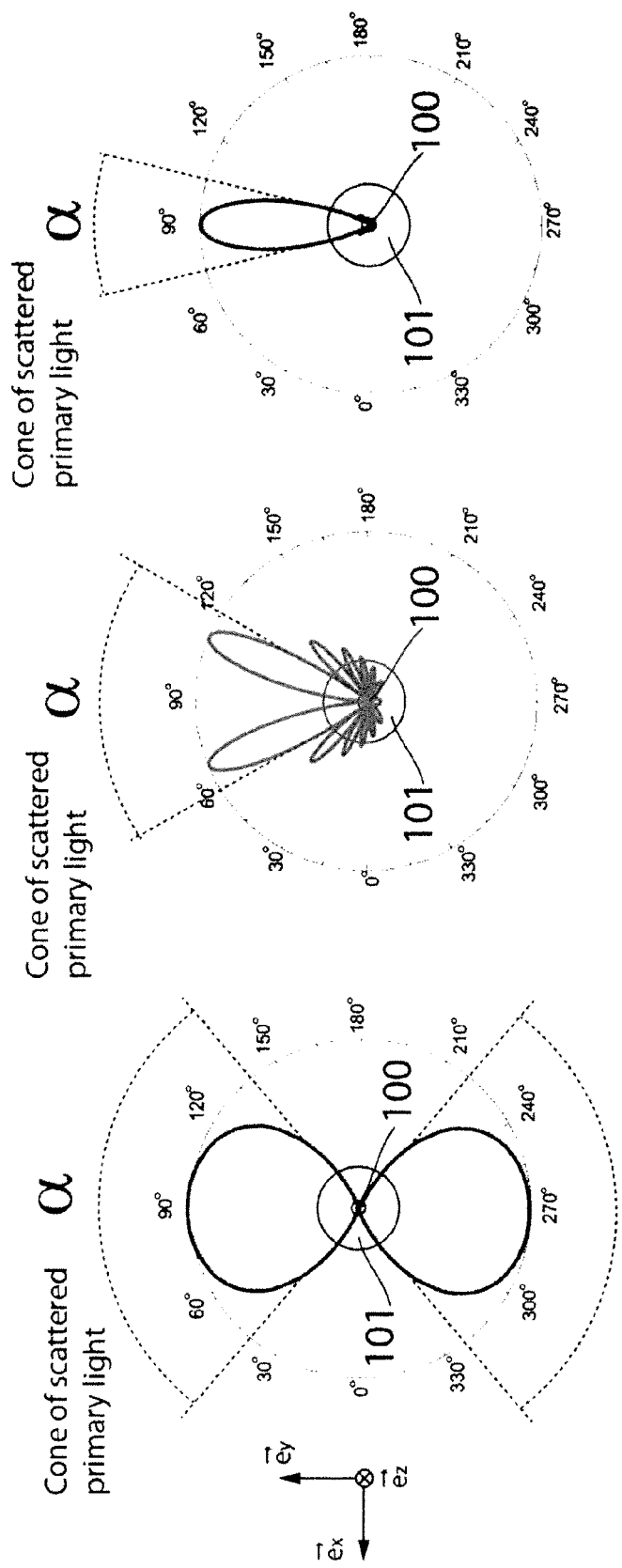

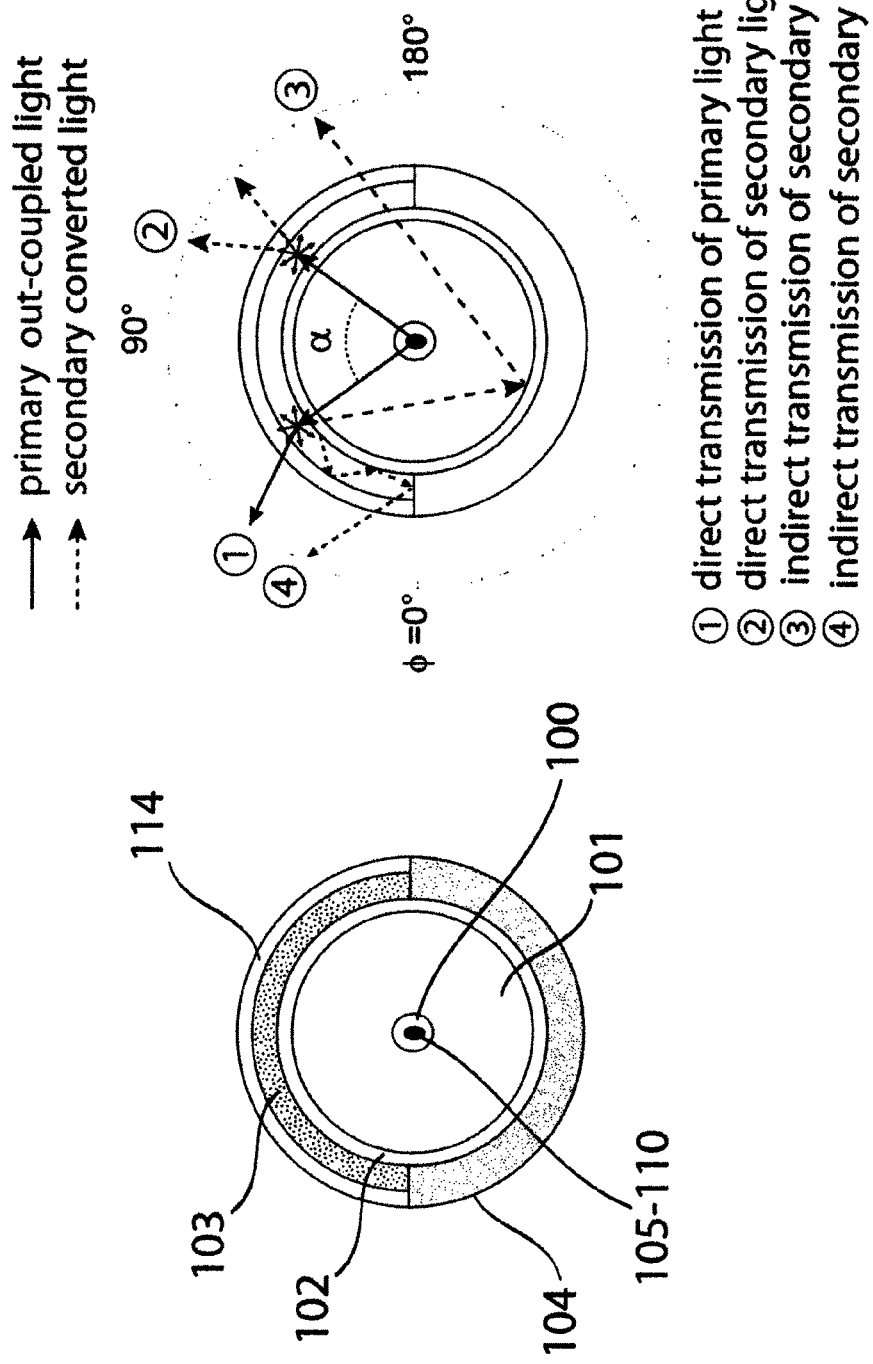

WAVEGUIDE APPARATUS FOR ILLUMINATION SYSTEMS

RELATED MATTERS

This application is a continuation of U.S. application Ser. No. 14/113,905, filed on Dec. 3, 2012, which is a National Stage Entry of PCT/IB2012/000617, filed on Mar. 28, 2012, which claims the benefit of the earlier filing date of U.S. Provisional Application No. 61/480,216, filed Apr. 28, 2011, entitled "Waveguide Apparatus for Illumination Systems."

FIELD OF THE INVENTION

An embodiment of the invention generally relates to a cylindrical waveguide apparatus that as part of a distributed illumination system may render white illumination in a more directional, uniform intensity and more energy efficient manner. Another embodiment is a method for manufacturing the apparatus. Other embodiments are also described.

BACKGROUND

In a basic fiber illumination system, a light source injects light into an optical fiber and the fiber then serves to transport the injected light to a remote, desired location. At the remote location, the fiber is exposed, typically at its end surface, so that the light can escape and illuminate the remote region that is outside and near the end surface of the fiber. More recently, a fiber-based illumination system has been suggested that has multiple regions each with a different index of refraction, and this can be used to allegedly deflect the propagating light out a side of the fiber along its length. See U.S. Pat. No. 5,905,837 to Wang, et al. A 360 degree or omnidirectional deflection pattern has also been suggested, through the use of combined changes in the ratio of index of refraction between the core and the cladding, and absorption and scattering coefficients in the fiber. See U.S. Pat. No. 6,714,711 to Lieberman, et al. A subsequent effort has suggested the use of a blazed diffraction grating in the core of the fiber, for diffracting the light out of the fiber, and a convex lens structure outside of the fiber is to receive the diffracted light and establish a linear illumination field. See U.S. Pat. No. 7,437,035 to Carver, et al. However, the efficacy of such techniques in efficiently producing illumination light having broadband visible content (also referred to here as white light) while ensuring its uniformity along the length of the fiber is not apparent.

SUMMARY

An embodiment of the invention is a light waveguide apparatus that may be part of a distributed illumination system that produces illumination having broadband visible content (white light) while allowing easy control of the color temperature and intensity uniformity of the illumination along the length of the waveguide. The apparatus has a waveguide that is to transport or guide primary light to a remote location, i.e. remote from a source of the primary light. The waveguide contains a number of scattering structures, which serve to re-distribute or redirect the propagating primary light out of a side surface of the waveguide and with a desired radiation pattern. The radiation pattern may be directional, for instance having at least one predetermined lobe of radiation having a radial spread of less than 360 degrees and at a desired radial position, and it may be positioned as desired in the longitudinal direction. A medium or layer of photo-luminescent material is provided, preferably outside of and running longitudinally along the waveguide, to absorb the re-directed primary light, and as a result emit a secondary, wavelength-converted light having a different wavelength than the primary light. The primary light should be quasi-single wavelength or monochromatic, as produced by for example a laser or a single-color light emitting diode (LED) that is tuned to a primary absorption band of the photo-luminescent medium. This produces broadband illumination light (also referred to here as white light) due to the secondary wavelength converted light being combined with any unabsorbed re-directed primary light, in a direction that, in one embodiment, may be transverse to the propagation axis of the waveguide, at the remote location. The illumination light may, in essence, be a combination of the wavelength converted secondary light (which may be of broader bandwidth than the primary light) plus any unabsorbed portion of the re-directed primary light. The waveguide apparatus also enables positioning the primary light source away from the light conversion location, so that thermal dissipation at that location may be reduced. Other embodiments are also described.

The waveguide be any suitable optical fiber such as single clad, multi-clad, and photonic-crystal or micro-structured fiber, which may yield better illumination efficiency due to lower parasitic reflections and lower manufacturing costs. In one embodiment, the optical fiber may have a core layer and a cladding layer. The scattering structures (e.g., micro-diffusers or reflectors) are preferably laser-induced structures previously formed inside the fiber, either entirely in the core layer, or partially in the core and partially in the cladding. These scattering structures are designed to redirect the primary light in accordance with a desired radiation pattern that cuts through the outer or front side surface of the fiber; the radiation pattern may thus have a shape defined in part by certain characteristics of the scattering structures. The photo-luminescent layer may be shaped to be concentric with the fiber, and/or may be shaped to receive, partially or completely (e.g., oriented perpendicular to) the radiation pattern of the redirected primary light. In particular, light conversion efficiency may be enhanced by (a) matching the geometry of the waveguide and that of the photo-luminescent layer (e.g., conforming an incident surface of the photoluminescence layer to the radiating or outer surface of the waveguide), and (b) adapting the refractive index difference between a material of the waveguide and a material of the photo-luminescent medium, particularly where the waveguide material has a refractive index that is about equal to or lower than that of the photo-luminescent medium.

An optional reflector may be positioned behind the waveguide and may be designed to reflect some of the radiation pattern of the re-directed primary light, together with any incoherent secondary light. For instance, the reflector may have a curved reflecting surface, and may be sized and positioned to be concentric with the cylindrical waveguide. In general however, the reflector may have a larger radius than that of the cylindrical waveguide, or it may have a non-circular shape, e.g., rectangular, V-shaped. In addition, or perhaps as alternative, there may be a reflector positioned between the photo-luminescent medium and the waveguide, that is designed to reflect the secondary light, and let pass the primary light. This may be part of an intermediate medium or layer that is formed between the outer side surface of the waveguide and the inner face of the photo-luminescent layer.

In one embodiment, homogeneous illumination, i.e. relatively uniform or fixed intensity and/or color quality, may be obtained along the length of the waveguide, by processing the laser-induced scattering structures so as to locate them close to each other, e.g. from a few nanometers to a few microns, and to vary their scattering strength as a function of their position along the length of the waveguide. This may enable the scattering strength to compensate for the inevitable power loss suffered by the primary light as it propagates along a scattering region or zone in the waveguide. Also, by using multiple primary light sources at different wavelengths, wherein the light from each of these light sources is scattered out by a respective scattering structure and then absorbed by a respective section of photo-luminescent layer, an improvement in the color quality of the illumination light may be possible. In general, the location, shape, size, strength, orientation and periodicity of the scattering structures, both along the primary light propagation axis as well as across or transverse to it, may be selected or adapted to yield a desired characteristic for the illumination light, e.g. an intentionally non-homogeneous illumination pattern.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIGS. 2a-2c are sectional views of example radiation patterns for the re-directed primary light.

FIG. 3a is a sectional end view of an example cylindrical waveguide apparatus in a fully integrated version.

FIG. 3b is a sectional end view of the example waveguide apparatus of FIG. 3a superimposed with references to the behavior of the primary and secondary light.

DETAILED DESCRIPTION

Figure 1A:
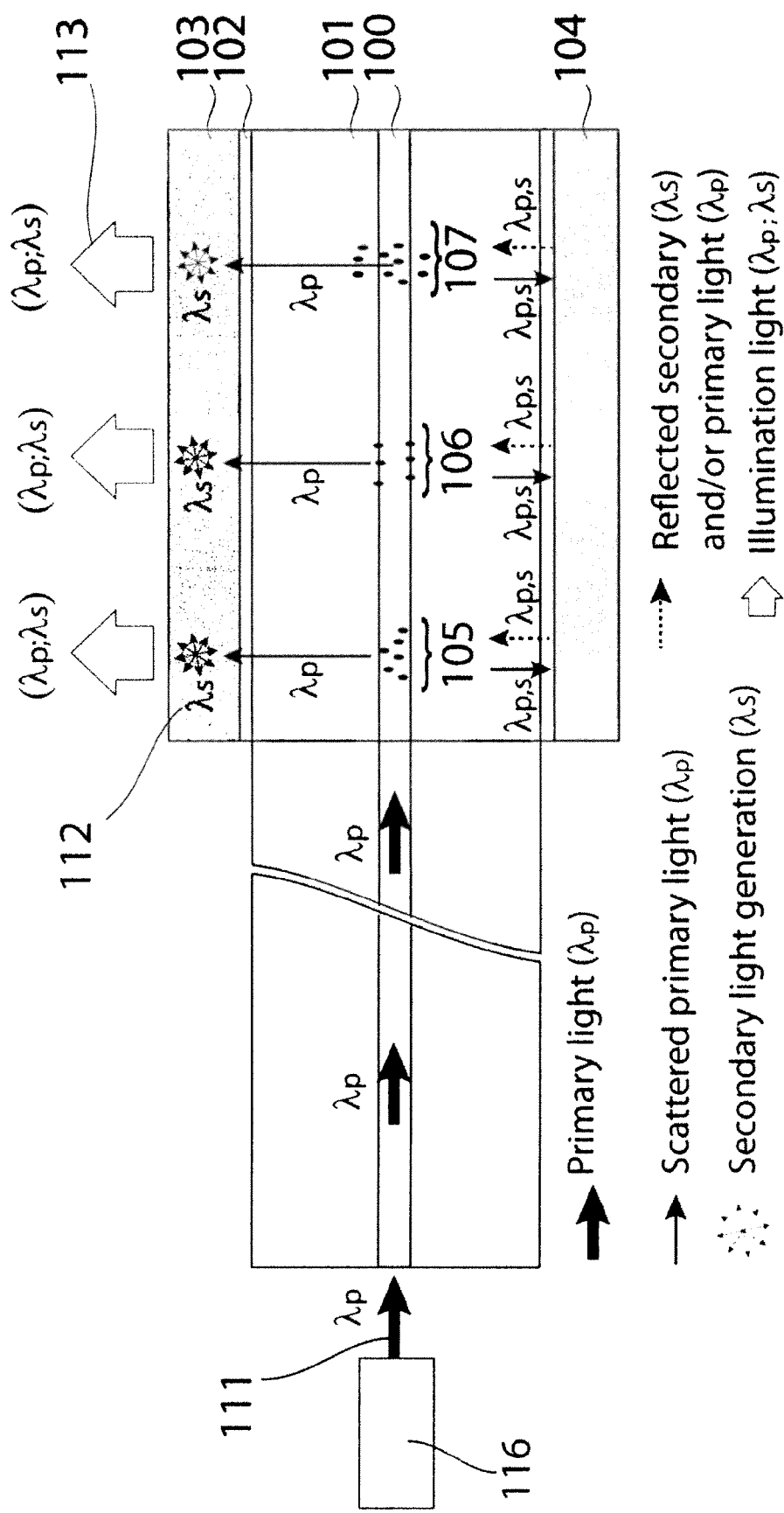
FIGS. 1a-1b are sectional side views of a waveguide apparatus in accordance with an embodiment of the invention, showing various types of scattering structures of various shapes and periodicity.

This disclosure describes a waveguide apparatus suitable for an efficient distributed illumination system that can produce white light at a location that is remote from a primary light source, and whose radiation pattern (including its radial angle and radial spread) and uniformity is easily controllable along the waveguide length. A discussion of certain terms used here is first given, followed by a description of various embodiments of the apparatus in relation to the figures. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known structures and techniques have not been shown in detail so as not to obscure the understanding of this description.

Wavelength—This term denotes the wavelength of the peak intensity of a light spectrum. For instance, this may relate to a quasi-single wavelength or monochromatic source (e.g., a laser) or it may relate to a broader spectrum yet still narrow band light source (e.g., a single color LED).

Primary light and primary light source—This refers to light that may be produced by any radiation source that is capable of causing an emission from a region of photo-luminescent material (also referred to here as a photo-luminescent layer). For example, the primary source may be an incoherent, relatively broad spectrum, yet still "single color", light emitting diode, LED, that comprises an active region (p-n junction) that may include one or several quantum wells and may contain GaN, AlGaN and/or InGaN material. The primary source may alternatively be an organic light emitting diode (OLED) or a source based on quantum dots. The primary source may alternatively be a coherent, sharp spectrum light source such as a laser emitting a single wavelength (also referred to here as quasi single wavelength), or it may be multiple single wavelength lasers, e.g. lasers emitting red, green and blue light (R, G, B), respectively.

Secondary light—This is light that is produced by a photoluminescence process that responds to the primary light. In one instance, the primary light is short wavelength (or "high" photon energy) light (e.g., green, blue or UV) that is absorbed by the photo-luminescent layer, while the secondary light refers is long wavelength light (or "low" photon energy) that is re-emitted by the photo-luminescent layer. The secondary light may also be referred to here as wavelength converted light.

Illumination light—This term refers to light having at least a spectrum portion that is visible to the human eye and that is generated based on a photo-luminescence process (the secondary light) and may also include some unabsorbed primary light. It may also have some components that are not visible, e.g. infrared. The illumination light may have a spectral power distribution similar to that of a white light emitting diode, WLED. The efficiency of the overall process for producing the illumination light may be enhanced when a wavelength of the primary light matches with an absorption spectral band of the photo-luminescence layer.

Color reproduction or color temperature—Color reproduction refers to a measure of the quality of the colors produced by an illumination source, and that are visible to the human eye (photometry curve). An example is the color rendering index, CRI. The color temperature is a characteristic of the visible light as referred to the ideal of black body radiation. Color temperature is typically given in a chromaticity diagram (CIE coordinates). In accordance with an embodiment of the invention, the CRI of the illumination light may be adjusted to a desired one, by e.g., adapting the chemical composition of the photo-luminescent medium. The color temperature may be adjusted by adapting the concentration (e.g., particle density) and/or thickness of the photo-luminescent medium. Other techniques for adapting the CRI, or alternatively the gamut, of the illumination light include doping the waveguide, e.g. its core, with an active component such as those used in optical fiber amplifiers and/or by using multiple, different color primary light sources.

Laser-induced scattering structures—This refers to the local modification of the waveguide material by exposure to an external high energy laser source. Such material modifications are not limited to local refractive index modifications but may also encompass true local material modifications (melted structures or voids). External laser processing sources that may be used include deep UV lasers (CW or excimer) that use the intrinsic photosensitivity of the waveguide material to locally modify the index of refraction; high peak power femtosecond lasers may be used in case the processed waveguide material is not sufficiently photosensitive. For instance, periodic patterns may be inscribed within a fiber core by exposing it to an intense interference pattern using an interferometer or a phase mask. Aperiodic scattering structures could be directly written inside the fiber core using the non-linear response of the glass matrix (preferred optical fiber material) to intense laser light. The strength of a structure may, for example, be in the range $\Delta n = 10^{-7}$ to $\Delta n = 10^{-2}$ (amplitude of change in index of refraction). The strength may be higher where the structure has melted. The period of a scattering structure (e.g., grating period) may be randomly selected, for example from the range 100 nm to 2 microns (in accordance with the wavelength of the primary light).

Figure 1B:
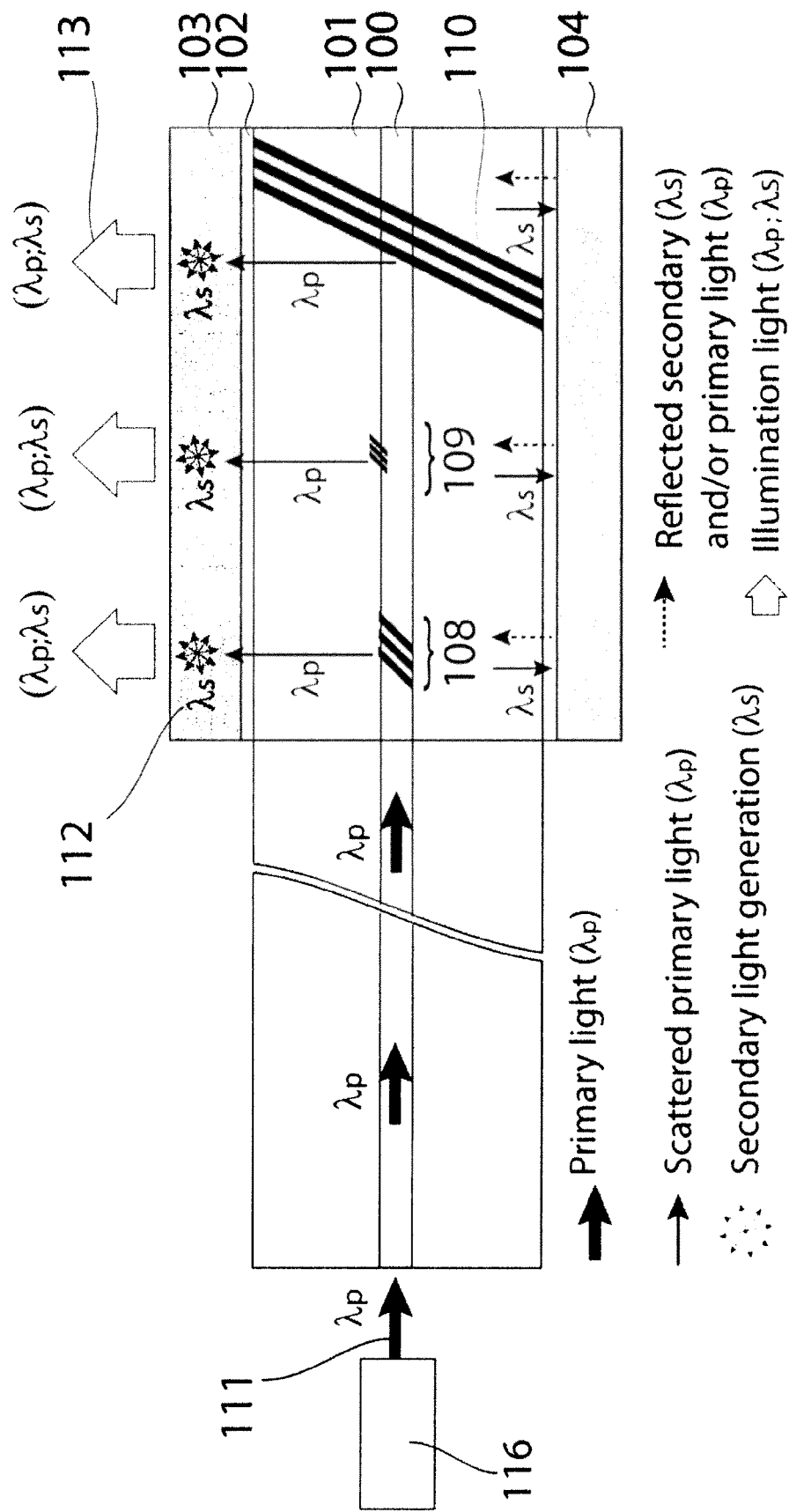

Turning now to FIGS. 1a-1b, these are sectional side views of a waveguide apparatus in accordance with an embodiment of the invention, showing various types of scattering structures formed therein. A primary light 111, produced by a primary light source 116 (also referred to as an excitation light source, for reasons given below), in this example is coupled into (e.g., an end surface of) and guided by a waveguide. An alternative here is to generate the primary light inside the waveguide, e.g. using a fiber laser structure that is formed along the waveguide (e.g., by exciting a doped region of a holey fiber filled with dye). The waveguide may be composed of a core 100 covered with a cladding 101. The core medium is in contact with the cladding medium, and these are designed such that the primary light (represented by $\lambda_p$ in the figures) can propagate in the core in the direction shown and along the longitudinal axis of the waveguide. Here, the propagation is via total internal reflection. In one instance, the waveguide is an optical fiber, e.g. multi-mode, single-core single-clad fiber made of flexible glass, although other types of cylindrical waveguides are possible such as photonic crystal fiber, micro-structure fiber, holey fiber, multi-clad fiber, and a light pipe having a core medium but no cladding layer, e.g. a transparent rod whose peripheral surface may be coated with a mirror layer except for a remote location where the primary light is to be re-directed outward, a transparent rod without a cladding layer and whose peripheral surface is exposed to air such that the air acts as a cladding for propagating the primary light. Note that in some types of cylindrical waveguide, such as micro-structure fiber, the primary light propagates along the waveguide by a bandgap effect due to the periodic nature of the micro-structure fiber that forbids propagation in directions other than along the waveguide.

The waveguide has one or more scattering structures formed therein as shown, which serve to re-direct the propagating or incident primary light out of a side surface of the waveguide. In other words, the primary light is redirected to a desired non-zero angle (e.g., transverse or about 90 degrees) relative to the longitudinal or optical propagation axis of the waveguide. The scattering structures may be confinement regions that produce a resonance of the incident primary light, in a traverse plane (resulting in a re-directed or scattered primary light that is coherent and that may exhibit a small wavelength shift relative to the incident primary light). The scattering structures may be laser-induced structures; these may be formed through the application of external, high-energy laser light to selected locations in the waveguide, as shown. The location, the shape, the size, the scattering strength, the tilt or orientation, and periodicity of the scattering structures, along and across (transverse to) the primary light propagation direction (longitudinal axis) in the waveguide can be selected, by adapting the focus, intensity and position of the external processing laser beam. The directionality of the re-directed primary light (its radial angle about the longitudinal axis of the waveguide, and its radial spread) may be primarily a function of the tilt and period of the scattering structures, although additional parameters may need to be considered and balanced as a whole, to obtain the desired re-directed primary light radiation pattern.

For instance, FIG. 1a shows a set of aperiodic scattering structures 105, 106, 107. These may be micro-diffusers that are entirely inside the core 100 (structures 105), in just a portion of the interface that joins the core 100 and the cladding 101 (structures 106), and/or crossing the entire core and cladding (structures 107). Any suitable combination of such structures 105-107 may be used to define a scattering zone; for instance, the scattering zone may be constituted entirely of just one type of scattering structure, e.g. only inside-the-core structure 105. FIG. 1b shows a set of periodic scattering structures 108, 109, 110 such as micro reflectors or tilted gratings. These may also be formed entirely inside the core 100 (structures 108), in just a portion of the interface that joins the core 100 and the cladding 101 (structures 109), and/or crossing the entire interface (structures 110). Any suitable combination of such structures 108-110 may be used to define a scattering zone; for instance, the scattering zone may be constituted entirely of just one type of scattering structure, e.g. only entire-interface-crossing structure 110. In general, any suitable combination and/or variation of one or more of the scattering structures 105-110 that yields the desired radiation pattern for the re-directed primary light, $\lambda_p$, may be used. The length of a scattering zone (containing one or more scattering structures) may be the same as or smaller than the length of the photo-luminescent layer 103 or photo-luminescent layer segment that is associated with the zone. Alternatively, the scattering zone may extend further than the photo-luminescent layer 103 or the photo-luminescent layer segment.

Still referring to FIGS. 1a-1b, the waveguide apparatus has a photo-luminescent layer (medium) 103 which is located so as to partially, or completely, absorb the re-directed primary light $\lambda_p$ to thereby emit secondary light 112 ($\lambda_s$) in accordance with a photo-luminescence process. This is also referred to as wavelength converted light. The resulting combination of this secondary light 112 and any unabsorbed primary light ($\lambda_p$; $\lambda_s$) is the desired illumination light 113. Such an illumination system may provide special advantages in the area of cylindrical waveguide-based distributed illumination systems, including improved energy efficiency, scalability, and homogeneous light output.

The photo-luminescent layer 103 may be made of a mixture of silicone (e.g., as part of an optically clear adhesive such as polydimethylsiloxane, PDMS) or other suitable material such as epoxy, together with a phosphor. The concentration of the phosphor and the size of the phosphor particles may be selected to modify or control the color temperature and luminous efficiency of the illumination system. Note the "phosphor" as used here refers to any material that exhibits luminescence, e.g. phosphorescent materials, fluorescent materials. The layer 103 may be composed of one or more layers of different compositions. For instance, there may be one or more intermediate non-phosphor layers sandwiched by phosphor layers.

A protection layer 114 may be added, in this case in contact with the outer side surface of the photo-luminescent layer 103, to cover the latter for purposes of physical protection and/or reduction of the index of refraction step between the layer 103 and the outer medium, i.e. external to the waveguide apparatus. See FIG. 3a. The protection layer 114 may also contain or simply be an anti-reflection coating, serving to reduce or minimize any back-reflection of the secondary light $\lambda_s$ off its back or rear surface.

Figure 1C:
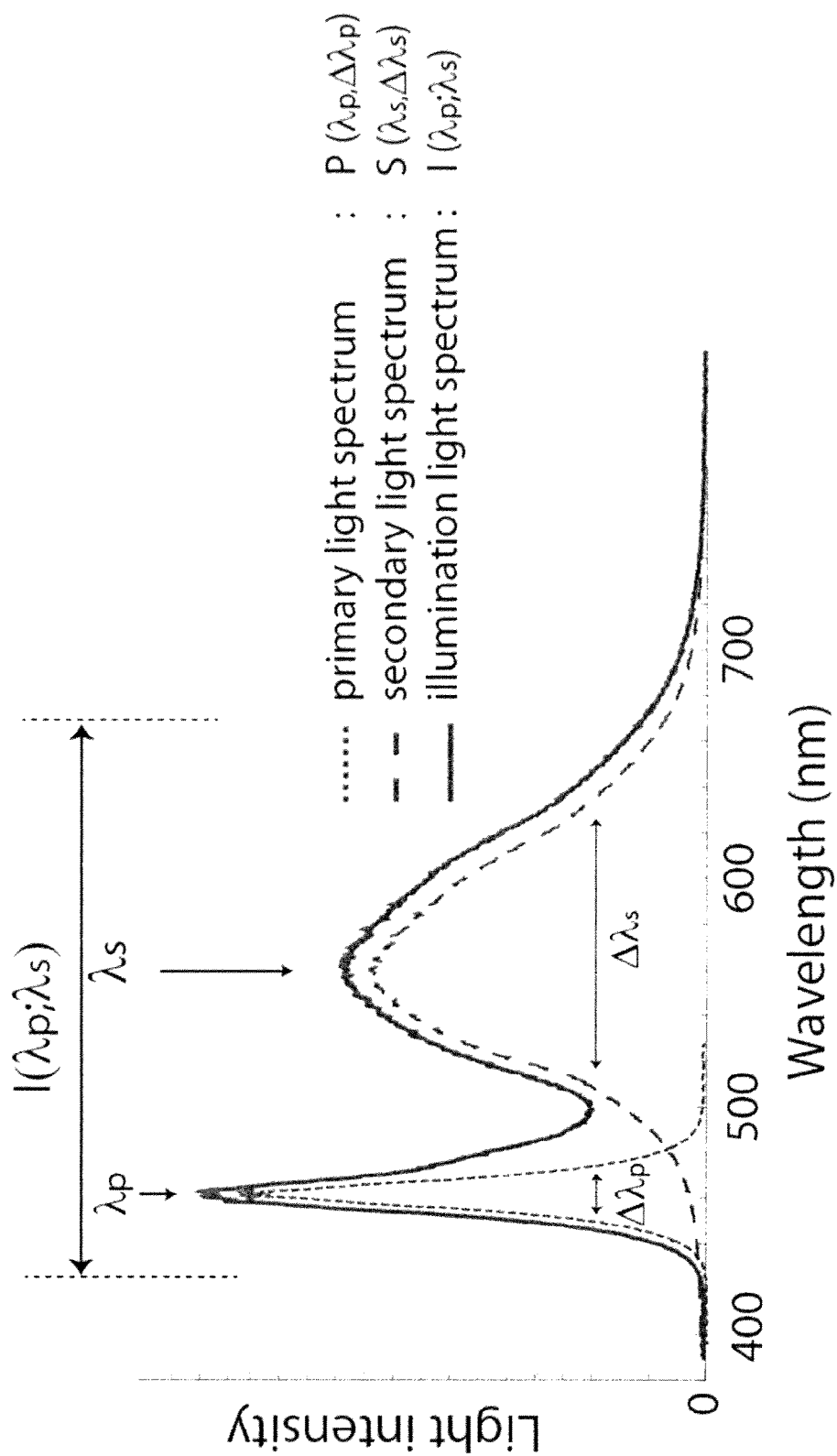
FIG. 1c is a graph of an example spectrum of the illumination light provided by the waveguide apparatus.

FIG. 1c is a graph of an example spectrum of the illumination light 113 provided by the waveguide apparatus. As seen here, the illumination light 113 has the spectrum $I(\lambda_p; \lambda_s)$, where the bandwidth, e.g. full width at half maximum (FWHM), of secondary light is given as $\Delta\lambda_s$, and that of the primary light is $\Delta\lambda$. In most instances, $\Delta\lambda_s$ will be about the same or larger than $\Delta\lambda_p$, $\lambda_p$ will be shorter than $\lambda_s$, i.e. has higher photon energy, and $\lambda_s$ will predominantly be in the visible part of the spectrum. In this example, the primary light is from a single wavelength source and is centered at between 440-490 nm, namely blue, with a bandwidth of between a few tenths of picometers (quasi-single wavelength, as may be obtained by a laser diode), to a few tens of nanometers (LEDs, or even a super-luminescence diode which can be wider than 100 nm). Other desirable options for the wavelength of the primary light include ultraviolet (300-400 nm), and violet (400-440 nm). More generally, however, the bandwidth and wavelength parameters could be different than the above, e.g. the primary light may be green, red, or even partially in the non-visible portion of the spectrum, e.g. near infrared.

As to the secondary light, FIG. 1c shows $\lambda_s$ centered at about 550 nm. This is typical of emissions by many popular types of phosphor layer material, e.g. Ce:YAG. For white light, a desired bandwidth of the illumination light 113 is between 380-740 nm. There may be some invisible content generated by the photoluminescence process and so in practice the bandwidth of the illumination light could be larger than 380-740 nm.

The photo-luminescent layer 103 may be located outside the waveguide as shown in FIG. 1a. The layer 103 may be deposited directly on the external side surface of the waveguide, to form an integral or single device with the waveguide—see FIG. 3a for an example.

Alternatively, an intermediate layer 102 may be provided between the photo-luminescent layer 103 and waveguide; it may serve to adapt an otherwise step in refractive index difference, between the waveguide and the photo-luminescent layer 103, to enable more efficient outcoupling of the redirected primary light (less reflection), and may be made of one or more sub-layers of glass, silicone, other suitably optically clear material. It may also include or be an anti-reflection coating that helps enhance the light transmission efficiency of the illumination system as a whole, by re-directing any back-reflected secondary light $\lambda_s$, i.e. secondary light that has been reflected by the back face photo-luminescent layer 103. The layer 102 may also be used to join the photo-luminescent layer 103, which may be a separate optical piece, to the waveguide, e.g. as an optically clear adhesive layer. The intermediate layer 102 may have a thickness similar to that of the photo-luminescent layer 103, but in some cases may be much thinner such as in the case where it is merely an anti-reflection coating or filter.

In another embodiment, an air gap is formed between the outer side surface of the waveguide (here, the outer side surface of the cladding layer 101) and the photo-luminescent layer 103, through which the re-directed primary light $\lambda_p$ passes before striking the photo-luminescent layer 103.

In order to lower the parasitic reflection at the interface between the waveguide and the photo-luminescent layer 103, the shape of the photo-luminescent layer 103 may conform to the radiation pattern of the re-directed primary light such that the primary light is incident upon the layer 103 transversely. In one embodiment, the layer 103 conforms to the waveguide such that it follows or conforms to, or has the same shape as, the external side surface of the waveguide. For instance, in the case of an optical fiber, the layer 103 could have a cylindrical shape and may also be positioned to be concentric to the optical fiber—see FIG. 3a. Alternatives are possible, for example as described below in connection with FIG. 5b and FIG. 5d. In general, the photo-luminescent layer 103 need not entirely cover the region along the longitudinal axis of the waveguide that scatters the primary light, i.e. some of the scattered primary light could bypass the photo-luminescent layer 103 and still contribute to the desired illumination. The length of the photo-luminescent layer 103 or photo-luminescent layer segment may be equal to or larger than its associated scattering zone, and may also depend on the angle of the incident, re-directed primary light.

The primary light strikes the photo-luminescent layer 103 at an angle that may be defined or fixed by the shape of the scattering structure that re-directed it; this may be designed to achieve the desired conversion by the photoluminescence process. In particular, the scattering efficiency, the distribution and the directionality of the radiated primary light are given by a combination of certain characteristics of the guided primary light (e.g., its wavelength, state of polarization, modal distribution) and certain parameters of the scattering structures (e.g., their magnitude, shape, and periodicity along/across the propagation axis). FIGS. 2a-2c are sectional views of example radiation patterns for the re-directed primary light, showing three possible combinations of fiber and scattering structure parameters that provide three different scattering distributions for the primary high energy light. The radiation pattern runs along the longitudinal axis (z-direction), according to the length of the scattering zone.

In FIG. 2a, a single micro-diffuser has been processed inside the core 100 of the waveguide. The primary light 111 is launched into the core 100 in, for example, a linear state of polarization at zero degrees, in the direction of the positive z-axis (into the paper), and the resulting scattered light distribution is shown. In this case, there are two radiation lobes opposing each other, each forming a large scattering cone having a radial spread a. In contrast, FIG. 2b shows a pattern that can be produced by, e.g. a tilted grating formed inside the core 100. Here, the primary light wavelength is chosen to be at an edge of the scattering wavelength band of the tilted grating (partially coherent scattering). The scattered light distribution here also presents two main lobes together forming a medium size cone of scattering angle α. Finally, in FIG. 2c, the tilted grating has been designed such that the primary light wavelength is at a location of the scattering wavelength band of the tilted grating where there is maximum scattering (coherent scattering). The resulting scattered light distribution has a single main lobe whose angle α is smaller than in FIG. 2a. For many applications, the scattering structures should be designed to yield a radiation pattern, for the re-directed primary light, that consists of a single lobe (similar to FIG. 2c) of up to 180 degrees of radial coverage or spread.

Note that generally speaking, a scattering structure is dispersive in that different frequency or color bands will be scattered at different angles. However, in most instances, the scattering bandwidth will be much broader than the relatively narrow bandwidth of the primary light contemplated here.

FIG. 3a is a sectional end view (in the azimuthal plane) of an example cylindrical waveguide apparatus. FIG. 3b is a sectional end view of the example waveguide apparatus of FIG. 3a superimposed with references to the behavior of the primary and secondary light. This is also an example of what a "fully-integrated" version of the waveguide apparatus might look like, where the elements of the apparatus have been combined with the waveguide itself to form in essence a single device. The waveguide apparatus includes a set of laser-induced scattering structures that may be any combination of the scattering structures 105-110 described above, formed in this case entirely inside the core 100 of the optical fiber. The core 100 is surrounded by a cladding 101, that enables the primary light to propagate along the fiber. The photo-luminescent layer 103 in this case may have been formed, e.g. deposited, sputtered, or evaporated to be in contact with the external surface of the cladding 101, and extends to cover at least the azimuthal scattering extent a of the primary light, as shown. As an alternative, the fiber may be embedded into the photo-luminescent medium—see FIG. 5c described below.

In this example, a reflector 104 has also been formed, e.g. deposited, sputtered, or evaporated in contact with the intermediate layer 102, positioned behind the photo-luminescent layer 103, and also in this case behind the fiber itself. Here, the reflector 104 is a layer that is concentric with the fiber. The reflector 104 may be a layer of a highly reflective polymer, e.g. polyphthalamide, or a layer of aluminum. It may be a dielectric layer coating on the fiber, e.g. may be deposited onto the intermediate layer 102. Alternatively, the reflector 104 may be positioned apart from the fiber, as part of a separate piece.

As seen in FIG. 3b, the primary light is partially scattered out of the fiber core 100 by the scattering structures 105-110, over a defined angle α. The primary light is then absorbed by the photo-luminescent layer 103, and re-emitted over a broader light spectrum. The primary light that is not directly absorbed by the photo-luminescent layer then illuminates an area outside the fiber (1). The secondary light may also directly illuminate outside the fiber (2), or it may do so indirectly, by reflection from the bottom reflector (3), or by partial guiding (4) within the photo-luminescent layer 103 and then off the reflector 104. A role of the intermediate layer 102 may be to adapt the refractive index difference between the fiber cladding material and the photo-luminescent layer 103. A role of the protection layer 114 is to facilitate the integration of the waveguide apparatus in the illumination system by reducing the index of refraction difference between the photo-luminescent layer 103 and the refractive index of the external to the waveguide apparatus. The protection layer 114 and the intermediate layer 102 may or may not be needed, as part of the waveguide apparatus, depending on the integration demands.

Figure 4:
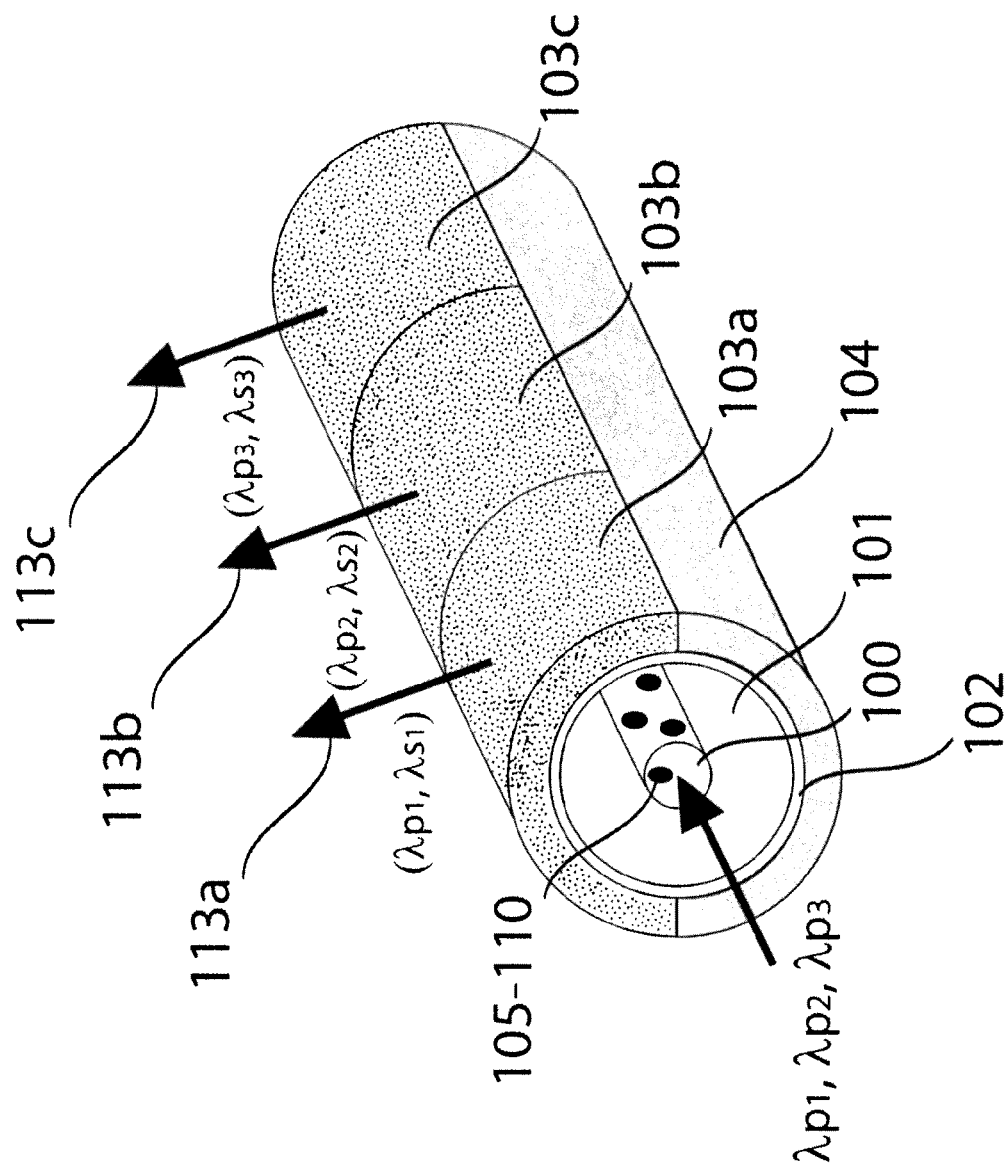
FIG. 4 is a perspective view of an example cylindrical waveguide apparatus for being coupled to multiple, different wavelength primary light sources.

Turning now to FIG. 4, this is a perspective view of an example cylindrical waveguide apparatus for being coupled to multiple, different wavelength primary light sources. In this embodiment of the invention, the apparatus has a photo-luminescent layer 103 whose longitudinal extension is non-continuous or non-uniform, and is composed of three segments 103a, 103b, and 103c. Also, multiple (different) wavelength primary light sources, in this example, three different color single-wavelength sources $\lambda_{p1}$, $\lambda_{p2}$, $\lambda_{p3}$, are coupled into and guided by the core 100 of the cylindrical waveguide. A separate set of one or more scattering structures 105-110 is designed to respond to each respective primary light wavelength, or to a set of two or more primary light wavelengths. Also, each of the photo-luminescent segments 103a-103c may be designed to respond to a respective primary light wavelength, or to a set of two or more primary light wavelengths. Note that in general, this concept can be extended to two or more primary light sources at different wavelengths.

In FIG. 4, a separate set of scattering structures 105-110 is provided to scatter out primary light of wavelength $\lambda_{p1}$ towards segment 103a, such that a broad wavelength band of illumination light 113a, containing $\lambda_{p1}$ and the associated secondary light $\lambda_{s1}$, is emitted as a result. Similarly, a separate set of scattering structures 105-110 (not shown) scatters out primary light of wavelength $\lambda_{p2}$ towards segment 103b, while a yet further set of scattering structures 105-110 (not shown) scatters out primary light of wavelength $\lambda_{p3}$ towards segment 103c. Thus, three, broad wavelength bands of illumination light 113a, 113b, 113c are emitted as a result. This embodiment may improve the CRI and/or extend the overall spectrum of the illumination light, where $\lambda_{p1}$, $\lambda_{p2}$, $\lambda_{p3}$ are produced by red, green, and blue primary light sources, respectively. It should be noted that in some cases, one or more of the photo-luminescent layer segments 103a-103c may be selected to be absent, such that in that region of the waveguide apparatus the re-directed primary light directly illuminates a desired region outside the waveguide apparatus, without any interaction with a photo-luminescent medium. For example, one phosphor-covered segment of the waveguide apparatus may produce white light, while a "clear" segment (spaced longitudinally along the waveguide) is producing blue light (because the re-directed primary light is not interacting with a phosphor medium in that segment). This may be used to tune the CRI or color temperature of the illumination light, by mixing together outside the waveguide apparatus both the secondary light and any desired primary light. The color temperature may also be tuned by adjusting the intensity of any one of the primary light sources relative to the others.

It should be noted that while FIG. 4 depicts a multi-segment photo-luminescent layer 103a-103c that is excited by primary light having multiple discrete wavelengths $\lambda_{p1}$, $\lambda_{p2}$, $\lambda_{p3}$, this multi-segment approach may also be useful for tuning the resulting illumination light ($\lambda_p$, $\lambda_s$) in the case where the primary light is just single-wavelength.

The overall conversion efficiency of the illumination light generation process described here may depend on several factors, including the electro-optical efficacy of the primary light source, the Stokes conversion efficiency, the quantum efficiency of the photo-luminescence layer, and the "package" efficiency. The package includes the geometry of the waveguide apparatus as a whole, and the distinct material interfaces involved along the path traveled by the light, from its "high energy state" upon being launched by the primary light source, to its "wavelength converted state" upon being re-emitted by the photo-luminescent layer.

Figure 5A:
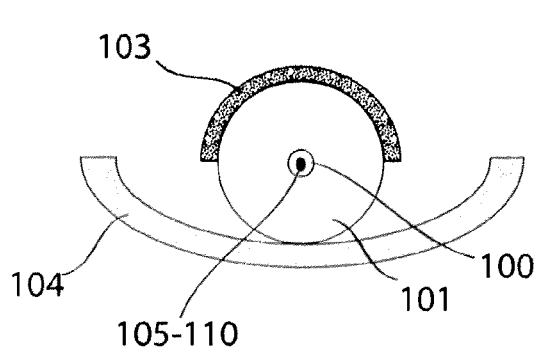
FIGS. 5a-5f are sectional end views of an example cylindrical waveguide apparatus, with different combinations of photo-luminescent layer and reflector.
Figure 5B:
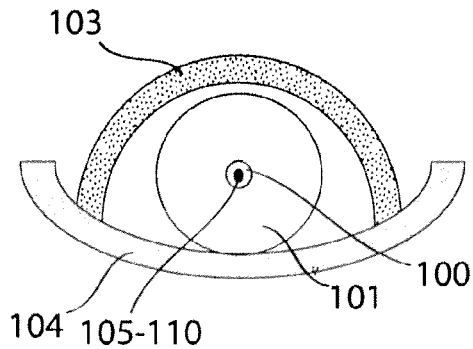
Figure 5C:
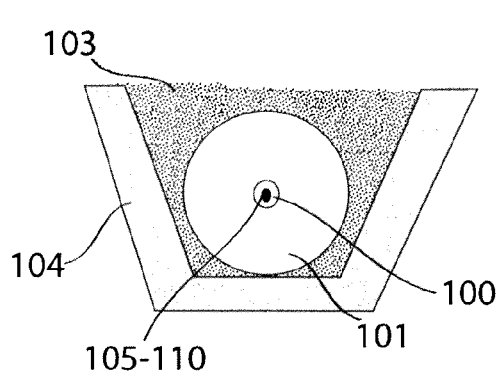
Figure 5D:
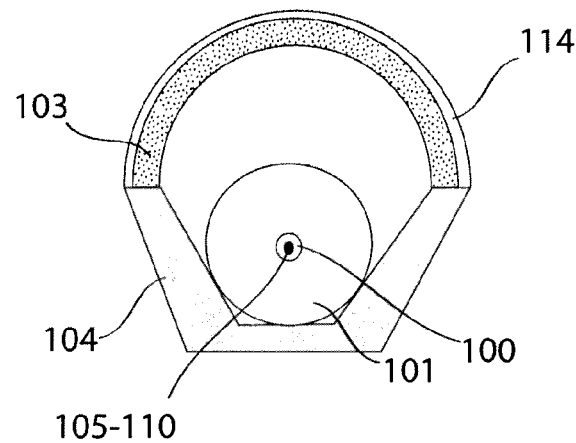
Figure 5E:
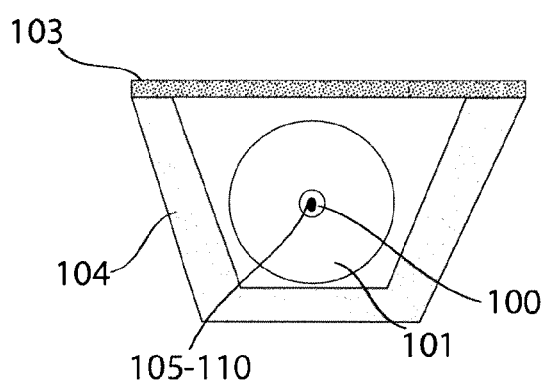
Figure 5F:
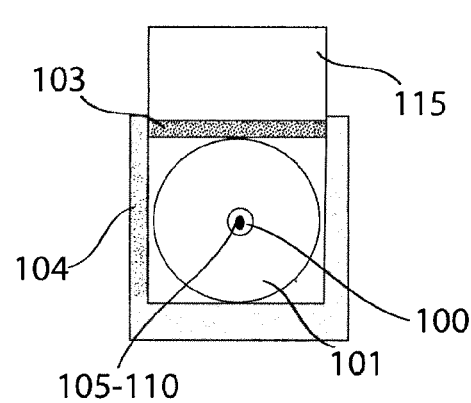

Referring now to FIGS. 5a-5f, these are sectional end views of an example cylindrical waveguide apparatus, with different combinations of photo-luminescent layer 103 and reflector 104. In all of these figures, the reflector 104 is said to be behind the waveguide (composed of core 100 and cladding 101), while the photo-luminescent layer 103 is said to be in front of the waveguide. In FIG. 5a and FIG. 5b, the reflector 104 has a smooth inner curved surface facing a rear of the waveguide and has a larger radius than the waveguide. In FIG. 5a, an inner surface of the photo-luminescent layer 103 is entirely in contact with the outer surface of the waveguide, while its outer surface also generally conforms to the outer surface of the waveguide. Here, the layer 103 may have a thickness of a few microns to a few millimeters. In contrast, in FIG. 5b, the inner surface of the layer 103 is not in contact with the waveguide outer surface, and its outer surface does not conform to the outer surface of the waveguide. In FIG. 5c, the waveguide is embedded in what appears to be a pool of the photo-luminescent layer/medium 103 carried by the bottom and side walls of the reflector 104, where essentially the entirety of the outer surface of the waveguide is in contact with the layer 103. The reflector 104 in this case may be viewed as a vessel in which the layer/medium 103 is contained, because the inner surface of the reflector 104 is in contact with the outer surface of the layer 103 all around the bottom of the layer 103. In FIGS. 5d-5f, the reflector 104 also defines a vessel that is carrying the waveguide, and there may be an air gap between the waveguide and the photo-luminescent layer 103. In FIG. 5d, the layer 103 is attached to and conforms to the shape of a protection layer 114 located in front of the layer 103; together these two form an arch that may be viewed as resting on the side walls of the reflector 104. In FIG. 5e and in FIG. 5f, the layer 103 is flat rather than curved, and closes off the top of the trench-like reflector 104; in FIG. 5, the layer 103 is formed on the back surface of a light guide sheet 115.

Other combinations of the waveguide, photo-luminescent layer/medium 103 and reflector 104 are possible. For instance, the photo-luminescent medium 103 may be a curved layer, e.g. cylindrical layer, formed on the outside surface of a cylindrical optical piece, where the latter surrounds a rectangular waveguide (with a scattering structure such as a tilted grating formed inside the rectangular waveguide).

Figure 6A:
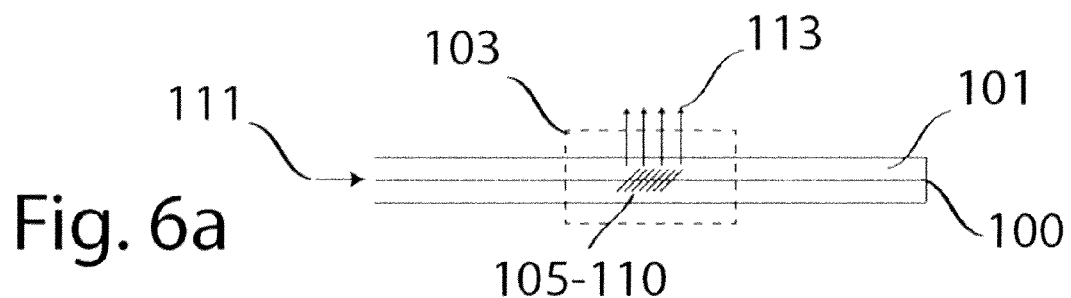
FIGS. 6a-6c are sectional side views of an example waveguide apparatus, showing various spacing between a scattering structure and its associated photo-luminescent layer.
Figure 6B:
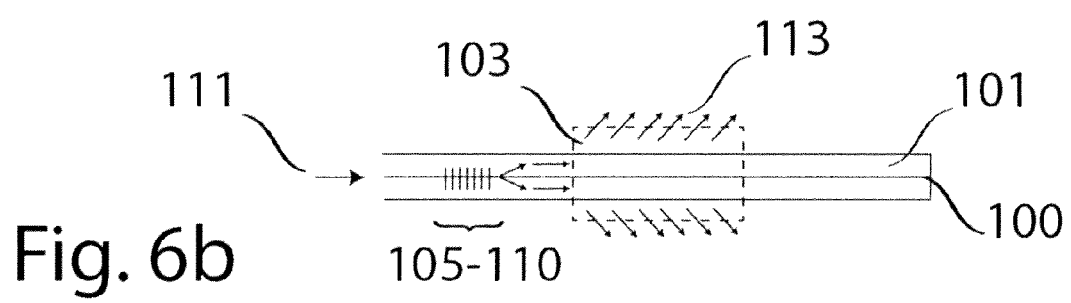
Figure 6C:
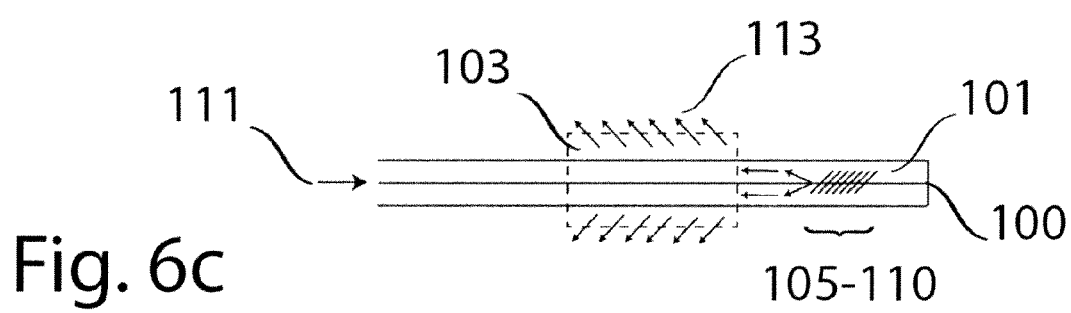

FIGS. 6a-6c are sectional side views of an example waveguide apparatus, showing various spacing that may be possible between a scattering structure 105-110 and its associated photo-luminescent layer 103. As above, the primary light source 116 produces primary light 111 that is coupled into the core 100 of a cylindrical waveguide having a cladding 101. The primary light propagates along and within the waveguide until it is redirected by the scattering structure 105-110. In FIG. 6a, this redirection is about 90 degrees relative to the longitudinal or propagation axis of the waveguide, or the re-directed primary light is transverse to the longitudinal or propagation axis. Also, the photo-luminescent layer 103 is positioned directly above the scattering structure, so as to present an active surface that is preferably oriented at about 90 degrees relative to the re-directed light. In contrast, in FIG. 6b, the scattering structure is such that the re-directed primary light is scattered forward, and into the cladding 101 (rather than transverse to the propagation axis), and is also longitudinally spaced rearward from the layer 103 (rather than being directly underneath the layer 103). To achieve such forward scattering, the periodicity of the scattering structures may be increased to above 1 micron and in accordance with the wavelength of the primary light. In another variation of such "offset" between the scattering zone and its associated photo-luminescent segment (layer 103), shown in FIG. 6c, the re-directed primary light is scattered rearward and into the cladding 101, and the scattering structure is longitudinally spaced forward from the layer 103. The latter two arrangements may be less efficient in producing the illumination light 113 than the arrangement in FIG. 6a. However, they may be needed to meet specific integration or packaging requirements, albeit at a cost of lower power efficiency in producing the illumination light. The longitudinal separation between the adjacent edges of a scattering structure and its associated layer 103 may be in the range of a few microns or more.

Figure 7:
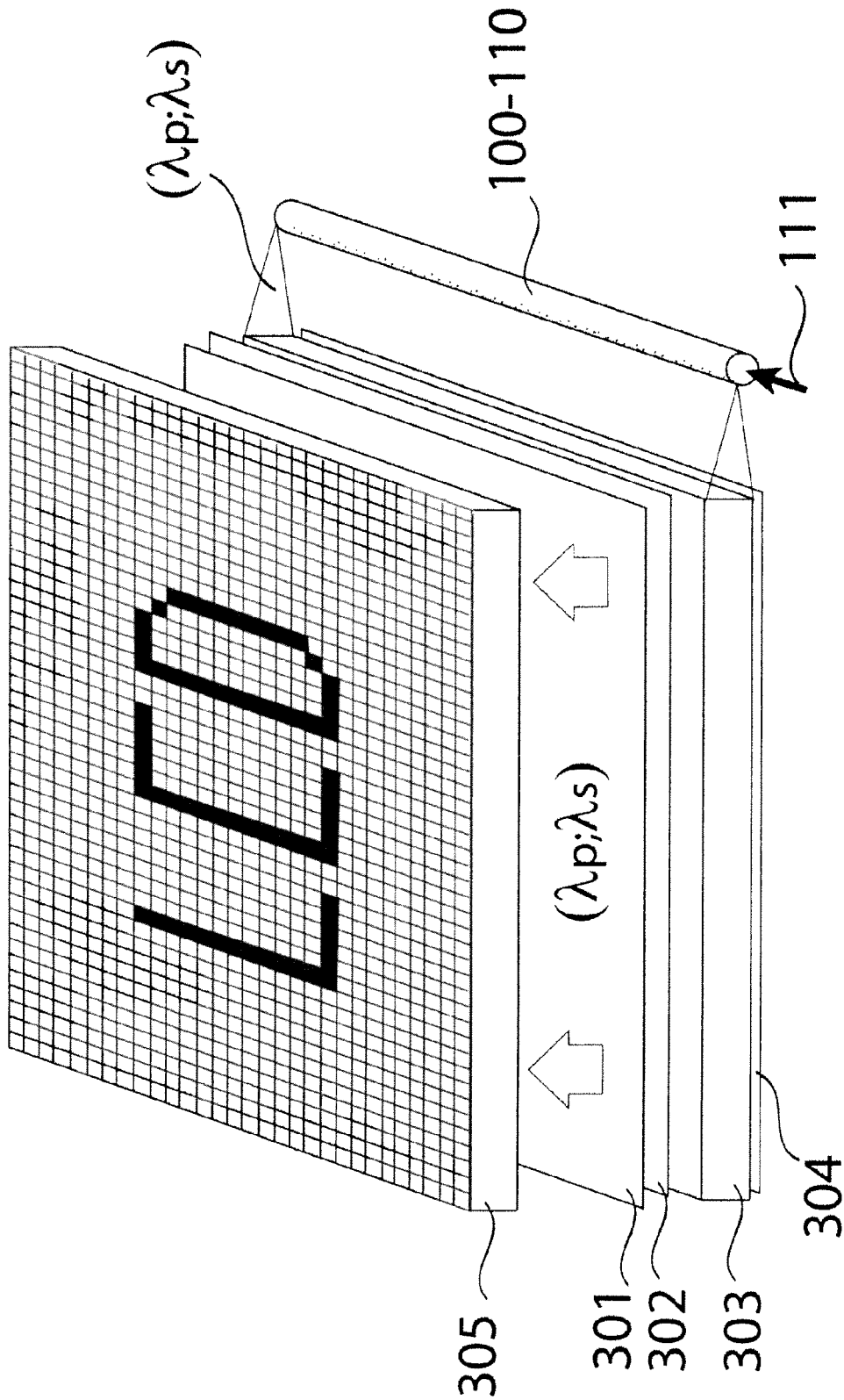
FIG. 7 shows an application of the waveguide apparatus.

Turning now to FIG. 7, a diagram of a backlighting application of the waveguide apparatus is shown. The backlighting system in this example has a stackup as follows: a display element array 305 (e.g., a matrix of color filters as in a liquid crystal display, LCD, panel) whose rear faces one or more prism sheets 301, followed by a diffuser sheet 302, and a light guide sheet 303, e.g. a backplate. Behind the light guide sheet 303 is a reflector sheet 304, which serves to reflect back any illumination light ($\lambda_p$; $\lambda_s$) towards the display element array 305. The illumination light ($\lambda_p$; $\lambda_s$) may be produced as a cone, e.g. of less than 180 degrees, by a cylindrical waveguide apparatus (referenced here as the combination of elements 100-110 described above in accordance with one of the embodiments of the invention), that radiates out of the outer side surface of the waveguide and is injected into a side surface of the light guide sheet 303 as shown. The light guide sheet 303 then directs the injected illumination light upward and spreads it onto and across the back face of the display element array 305. Note that other backlighting systems are possible, including ones that do not have a display element array, e.g. a plain, edge-lighting system.

Figure 8:
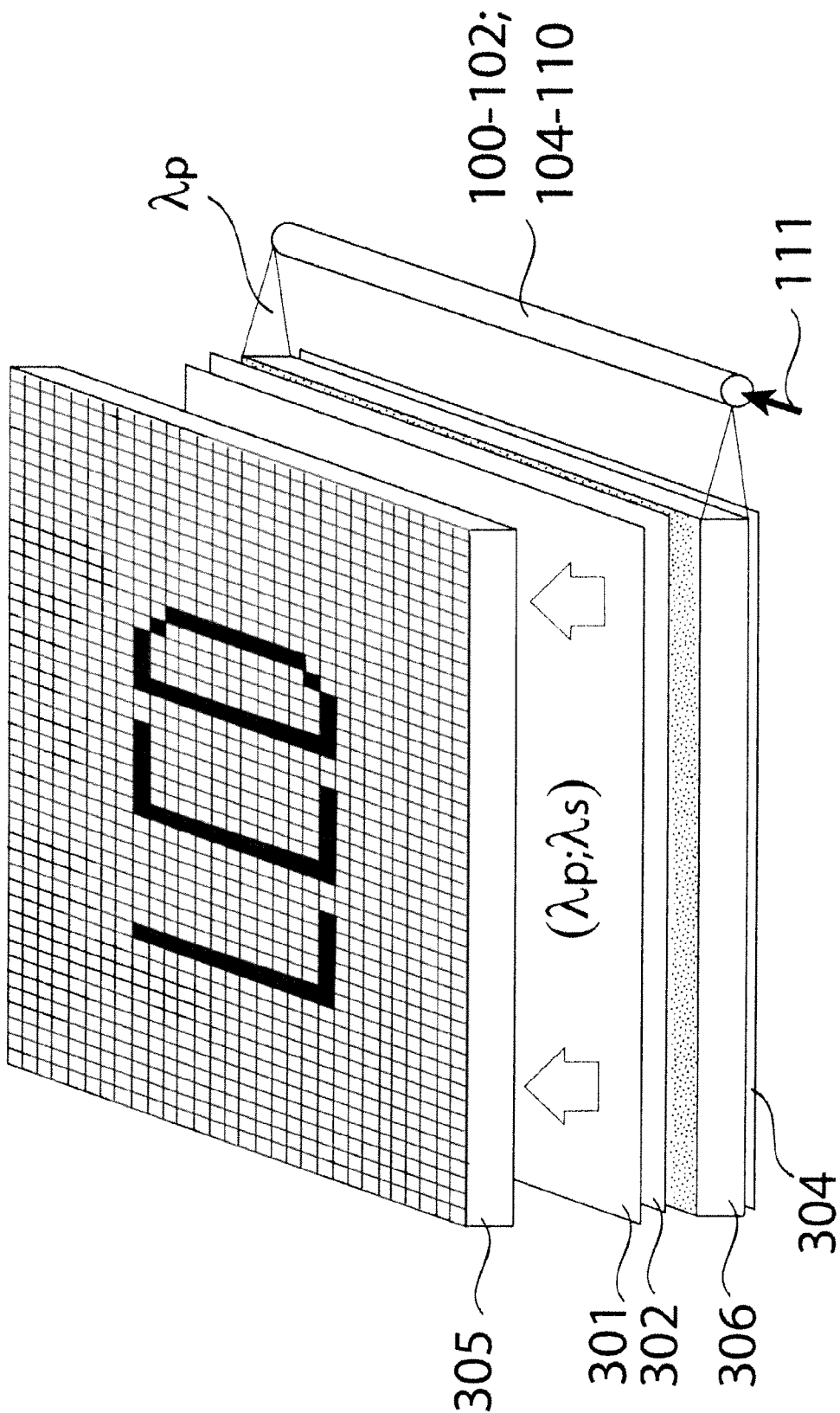
FIG. 8 shows another application of the waveguide apparatus.

FIG. 8 shows another display system in which the backlighting illumination light ($\lambda_p$; $\lambda_s$) is produced within the stackup of a backlighting system, rather than being produced outside (by a waveguide apparatus) and then injected into a side surface of the stackup. The waveguide apparatus in this case may be an optical fiber similar to the one depicted in FIG. 3a, except that the photo-luminescent medium 103 is absent. The waveguide apparatus in this case may contain only the following cylindrical waveguide elements: core 100, cladding 101, scattering zone containing a combination of one or more structures selected from the group consisting of structures 105-110, and reflector 104 (with the intermediate layer 102 and protection layer 114 being optional). The re-directed primary light $\lambda_p$ (which may also have an elongated cone shaped radiation pattern of less than 180 degrees, similar to those depicted in FIGS. 2a-2c) emerges from a side-scattering elongated waveguide and is then injected into the outer side surface of a special light guide sheet 306. The latter has an outer upper face that has been coated with a layer of photo-luminescent material (shown in FIG. 8 as shading). The special light guide sheet 306 then directs the injected primary light upward and spreads it onto and across the back face of the layer of photo-luminescent material, which in turn emits secondary light $\lambda_s$. The latter together with any unabsorbed $\lambda_p$ provide the desired illumination light that is incident on the back face of the display element array 305.

A process for manufacturing the waveguide apparatus may be as follows. Unless specifically required, the operations here do not have to be any particular order. A region of light scattering structures is formed within a waveguide extending along a longitudinal axis of the waveguide. The region of scattering structures is adapted to re-direct a primary light, that will be propagating in the waveguide along the longitudinal axis, out of an outer side surface of the waveguide. A medium of photo-luminescent material is formed that is positioned outside the waveguide to absorb the re-directed primary light and thereby emit secondary light.

The forming of the region of light scattering structures may include laser processing the waveguide, to create the region of light scattering structures therein. The laser processing may take place before forming the photo-luminescent medium. The laser processing may include changing focus intensity and position of a processing laser beam, that is aimed at the waveguide, to set one or more of the following parameters of the light scattering structures: location, shape, size, orientation or tilt, and periodicity. The laser processing may thus be adapted to yield the desired scattering structures, having a particular scattering strength and directionality. For example, the scattering structures within a given region may be written so that the scattering strength of the region is less at a proximal point than at a distal point along the longitudinal axis of the waveguide; this may help improve the uniformity of the intensity of the white light along the waveguide, by compensating for the inevitable losses in the primary light as it propagates through the scattering region.

The medium of photo-luminescent material may conform to the outer side surface of the waveguide. For example, formation of the medium of photo-luminescent material may include creating a layer of the photo-luminescent material on the side surface of the waveguide. An intermediate layer may be formed on the side surface of the waveguide, prior to the layer of the photo-luminescent material being formed (on the outer side surface of the intermediate layer). The process may use a mixture of silicone-phosphor to form the photo-luminescent layer on an optical fiber; the mixture can be made in a separate operation and then dispensed (or thermo-dispensed, sputtered, or evaporated) onto the previously manufactured fiber. As an alternative, the silicone-phosphor mixture can be made directly on the outer side surface of the fiber. For instance, the silicone may be dispensed onto the fiber and then the phosphor can be sputtered on it. A thermal annealing operation might then be necessary for the polymerization. A membrane or film of the mixture can be made in a separate operation and then deposited or bonded onto the fiber for better control of the layer thickness.

An alternative is to at least partly (e.g., entirely) embed the waveguide into a pool of the photo-luminescent medium.

The intermediate layer formed between the waveguide and the medium of photo-luminescent material may be adapted to increase efficiency of outcoupling of the re-directed primary light, e.g. by having multiple layers of light passing material with index of refractions chosen to adapt the otherwise step in refractive index between the photo-luminescent medium and the waveguide.

The process may also include the formation of a reflector behind the waveguide and that faces the medium of photo-luminescent material (which is considered in that case to be in front of the waveguide). The reflector may be V-shaped or curved, e.g. U-shaped. The reflector may include a reflective layer that conforms to the outer side surface of the waveguide and is designed to reflect both the primary light and the secondary towards the photo-luminescent medium.

While certain embodiments have been described and shown in the accompanying drawings, it is to be understood that such embodiments are merely illustrative of and not restrictive of the broad invention, and that the invention is not limited to the specific constructions and arrangements shown and described, since various other modifications may occur to those of ordinary skill in the art. For example, although the figures show the photo-luminescent layer 103 being outside of the cladding 101 of the waveguide, and hence not in contact with the core 100, a less desirable alternative is to chemically or mechanically remove some portion of the cladding 101 to create in effect a trench that exposes the core 100, and then fill the trench with photo-luminescent material. The description is thus to be regarded as illustrative instead of limiting.

What is claimed is:

1. A waveguide apparatus for an illumination system, comprising:
   a waveguide in which a core medium is in contact with a cladding medium and in which primary light is to propagate in the core medium along its longitudinal axis under total internal reflection against the cladding, the waveguide having formed therein a first zone of scattering structures, being a laser-induced modification of at least the core medium that runs along the longitudinal axis and that is to scatter the propagating primary light out of the waveguide in a directional radiation pattern having at least one lobe whose predetermined radial spread of less than 360 degrees is at a desired radial position, wherein scattering strength of the first zone varies as a function of position along the longitudinal axis of the waveguide; and
   a photo-luminescent medium that runs along the longitudinal axis of the waveguide, and is positioned to absorb the scattered primary light to thereby emit a secondary wavelength converted light.

2. The apparatus of claim 1 wherein the photo-luminescent medium conforms to or has the same shape as a side surface of the waveguide and extends around the entire circumference of the waveguide.

3. The apparatus of claim 2 further comprising an elongated reflector running along the longitudinal axis, that is outside of the waveguide_and facing the photo-luminescent medium.

4. The apparatus of claim 3 further comprising:
   a light source to produce the primary light, the light source being coupled to an end surface of the waveguide to couple the primary light into the waveguide, wherein the primary light is to propagate within the waveguide, in a downstream direction along the longitudinal axis of the waveguide, until it is redirected by the first zone at a selected location that is downstream of where the light source is located.

5. The apparatus of claim 2 further comprising:
   a light source to produce the primary light, the light source being coupled to an end surface of the waveguide to couple the primary light into the waveguide, wherein the primary light is to propagate within the waveguide, in a downstream direction along the longitudinal axis of the waveguide, until it is redirected by the first zone at a selected location that is downstream of where the light source is located.

6. The apparatus of claim 1 further comprising:
a light source to produce the primary light, the light source being coupled to an end surface of the waveguide to couple the primary light into the waveguide, wherein the primary light is to propagate within the waveguide, in a downstream direction along the longitudinal axis of the waveguide, until it is redirected by the first zone at a selected location that is downstream of where the light source is located.

7. The apparatus of claim 6 wherein the primary light produced by the light source is in a non-visible spectrum.

8. The apparatus of claim 1 further comprising an intermediate medium between an outer side surface of the waveguide and the photo-luminescent medium.

9. The apparatus of claim 8 wherein the intermediate medium is to adapt the step in refractive index difference between the waveguide and the photo-luminescent medium, so as to improve the efficiency with which the primary light is extracted from the waveguide and strikes the photo-luminescent medium and to improve the extraction efficiency of the secondary light out of the photo-luminescent medium.

10. The apparatus of claim 1 wherein an air gap is formed between an outer side surface of the waveguide and the photo-luminescent medium.

11. The apparatus of claim 1 wherein the scattering strength of the first zone is defined by a change in index of refraction $\Delta n$ in the range $\Delta n - 10^{-7}$ to $\Delta n = 10^{-2}$.

12. The apparatus of claim 1 wherein the scattering strength of the first zone varies as a function of position along the longitudinal axis of the waveguide in a way that compensates for power loss that would be suffered by the primary light as it propagates along the first zone.

13. The apparatus of claim 1 further comprising an elongated reflector running along the longitudinal axis, that is outside and facing an outer side surface of the waveguide.

14. The apparatus of claim 1 further comprising a second scattering zone that a) is positioned further downstream than the first zone and b) has greater scattering strength than the first zone when re-directing the primary light, wherein the photo-luminescent medium extends further along the longitudinal axis of the waveguide and is positioned to absorb scattered primary light from the second zone to thereby emit further secondary wavelength converted light.

15. A method for manufacturing a waveguide apparatus for an illumination system, comprising:
forming a region of light scattering structures within a waveguide in which a core medium is in contact with a cladding medium and in which primary light is to propagate along its longitudinal axis, by laser processing at least the core medium along the longitudinal axis to create therein the region of light scattering structures wherein the region of light scattering structures is adapted to re-direct a primary light, that is propagating in the waveguide along the longitudinal axis, out of an outer side surface of the waveguide in a directional radiation pattern; and
creating a layer of photo-luminescent material on an entirety of an outer side surface of the waveguide, wherein the layer of photo-luminescent material is to absorb the re-directed primary light and thereby emit secondary light.

16. The method of claim 15 wherein a scattering strength of the region of light scattering structures is given by a change in index of refraction $\Delta n$ in the range $\Delta n = 10^{-7}$ to $\Delta n = 10^{-2}$.

17. The method of claim 16 wherein said laser processing comprises using a laser interferometry technique to write periodic scattering structures in the waveguide.

18. The method of claim 15 wherein the laser processing comprises:
changing focus intensity or position of a processing laser beam that is aimed at said waveguide to set one or more of the group consisting of location, shape, size, orientation or tilt, and periodicity of the light scattering structures, so that a scattering strength of the region of light scattering structures is less at a proximal point than at a distal point along the longitudinal axis of the waveguide in a way that compensates for power loss that would be suffered by the primary light as it propagates along said region.

19. The method of claim 18 further comprising:
forming a reflector behind the waveguide.

20. A light waveguide apparatus comprising:
waveguide means in which a core medium is in contact with a cladding medium for guiding primary light that propagates in the core medium in a longitudinal direction under total internal reflection against the cladding medium, and having formed therein means for re-directing the primary light out of the waveguide means, the re-directing means being a zone of scattering structures that is a laser-induced modification of at least the core medium that runs along the longitudinal direction and that is to scatter the primary light out of the waveguide means in a directional radiation pattern having at least one lobe, wherein scattering strength of the zone varies as a function of position along the longitudinal axis of the waveguide in a way that compensates for power loss that would be suffered by the primary light as it propagates along said zone; and
photo-luminescent means for absorbing the re-directed primary light to thereby emit secondary wavelength converted light having a different wavelength than said primary light.

21. The light waveguide apparatus of claim 20 wherein the photo-luminescent means is a non-uniform layer having a plurality of different composition segments that are arranged side by side along the longitudinal direction of the waveguide means.

22. The light waveguide apparatus of claim 20 wherein the photo-luminescent means is a non-uniform layer having a plurality of different thickness segments that are arranged side by side along the longitudinal direction of the waveguide means.

23. The light waveguide apparatus of claim 20 wherein the photo-luminescent means is a non-uniform layer having a plurality of segments which together configure the light waveguide apparatus to have at least one phosphor-covered segment and at least one clear segment.

24. The light waveguide apparatus of claim 20 further comprising reflector means located behind and facing the waveguide means.

25. The light waveguide apparatus of claim 20 further comprising:
a light guide sheet means positioned relative to the waveguide means so that white light, consisting essentially of any unabsorbed re-directed primary light combined with the secondary wavelength converted light outside of the waveguide means, is coupled into a side surface of the light guide sheet means.

26. The light waveguide apparatus of claim 20 further comprising a light guide sheet means wherein the photo-luminescent means is a layer formed on a front face of the light guide sheet means, and wherein the light guide sheet means is positioned relative to the waveguide means so that the re-directed primary light is coupled into a side surface of the light guide sheet means and is then directed to the front face, and wherein white light consisting essentially of any unabsorbed re-directed primary light combined with the secondary wavelength converted light emerges from the front face of the light guide sheet means.

27. The light waveguide apparatus of claim 20 wherein the photo-luminescent means is a photo-luminescent layer having at least one absent segment such that in that region of the light waveguide apparatus the re-directed primary light directly illuminates a desired region outside the light waveguide apparatus without interaction with a photo-luminescent medium.

28. The light waveguide apparatus of claim 20 further comprising:

a light source to produce the primary light, the light source being coupled to an end surface of the waveguide means to couple the primary light into the waveguide means, wherein the primary light is to propagate within the waveguide means in a downstream direction along the longitudinal direction until it is redirected by the laser-induced modification of the core medium at a selected location that is downstream of where the light source is located.

29. The light waveguide apparatus of claim 20 wherein the scattering strength of the zone of scattering structures is given by a change in index of refraction $\Delta n$ in the range $\Delta n = 10^{-7}$ to $\Delta n = 10^{-2}$.

* * * * *